(12) United States Patent
de Sousa Marques Gonçalves Coelho et al.

(10) Patent No.: US 11,746,464 B2
(45) Date of Patent: Sep. 5, 2023

(54) SHEET STRUCTURES CONTAINING NATURAL POLYMERS AND MICROSPHERES

(71) Applicant: TMG—Tecidos Plastificados e Outros Revestimentos Para a Indústria Automóvel, S.A., V.N. Famalicão (PT)

(72) Inventors: Ana Francisca de Sousa Marques Gonçalves Coelho, Vila-Nova Famalicão (PT); Elizabete Peixoto de Pinho, Oporto (PT); Luis Filipe Carvalho da Silva, Braga (PT)

(73) Assignee: TMG—Tecidos Plastificados e Outros Revestimentos Para a Indústria Automóvel, S.A., V.N. Famalicão (PT)

( * ) Notice: Subject to any disclaimer, the term of this patent is extended or adjusted under 35 U.S.C. 154(b) by 247 days.

(21) Appl. No.: 17/312,033

(22) PCT Filed: Dec. 2, 2019

(86) PCT No.: PCT/EP2019/083249
§ 371 (c)(1),
(2) Date: Jun. 9, 2021

(87) PCT Pub. No.: WO2020/120189
PCT Pub. Date: Jun. 18, 2020

(65) Prior Publication Data
US 2022/0025576 A1     Jan. 27, 2022

(30) Foreign Application Priority Data

Dec. 11, 2018   (EP) .................................... 18211642

(51) Int. Cl.
*B32B 27/12*     (2006.01)
*D06N 3/00*      (2006.01)
(Continued)

(52) U.S. Cl.
CPC .......... *D06N 3/0043* (2013.01); *B32B 27/12* (2013.01); *B32B 27/304* (2013.01);
(Continued)

(58) Field of Classification Search
CPC ............ B32B 2255/02; B32B 2255/26; B32B 2266/0235; B32B 2605/003; B32B 2605/08; B32B 27/065; B32B 27/12; B32B 27/20; B32B 27/304; B32B 5/18; B32B 5/245; D06N 2205/04; D06N 2205/08; D06N 2211/263; D06N 2211/28; D06N 3/0043; D06N 3/0061; D06N 3/0068;
(Continued)

(56) References Cited

FOREIGN PATENT DOCUMENTS

| EP | 3051023 A1 | 8/2016 |
| WO | 2017202510 A1 | 11/2017 |

OTHER PUBLICATIONS

European Patent Office, International Search Report and Written Opinion dated Jan. 24, 2020, for International Patent Application No. PCT/EP2019/083249.

*Primary Examiner* — Lawrence D Ferguson
(74) *Attorney, Agent, or Firm* — Duane Morris LLP

(57) ABSTRACT

The present invention provides a sheet structure comprising a carrier layer and a foamed cover layer which contains polyvinyl chloride, lignocellulosic based components and hollow microspheres, and a method for producing the sheet structure. The sheet structure can be used as an artificial leather, e.g. for flexible automotive interiors.

11 Claims, 1 Drawing Sheet

(51) Int. Cl.
*B32B 27/30* (2006.01)
*D06N 3/02* (2006.01)
*D06N 3/06* (2006.01)

(52) U.S. Cl.
CPC .......... *D06N 3/0061* (2013.01); *D06N 3/0068* (2013.01); *D06N 3/0077* (2013.01); *D06N 3/02* (2013.01); *D06N 3/06* (2013.01); *B32B 2255/02* (2013.01); *B32B 2255/26* (2013.01); *B32B 2605/003* (2013.01); *B32B 2605/08* (2013.01); *D06N 2205/04* (2013.01); *D06N 2205/08* (2013.01); *D06N 2211/263* (2013.01); *D06N 2211/28* (2013.01); *D10B 2201/01* (2013.01); *D10B 2505/12* (2013.01)

(58) Field of Classification Search
CPC .......... D06N 3/0077; D06N 3/02; D06N 3/06; D10B 2201/01; D10B 2505/12
See application file for complete search history.

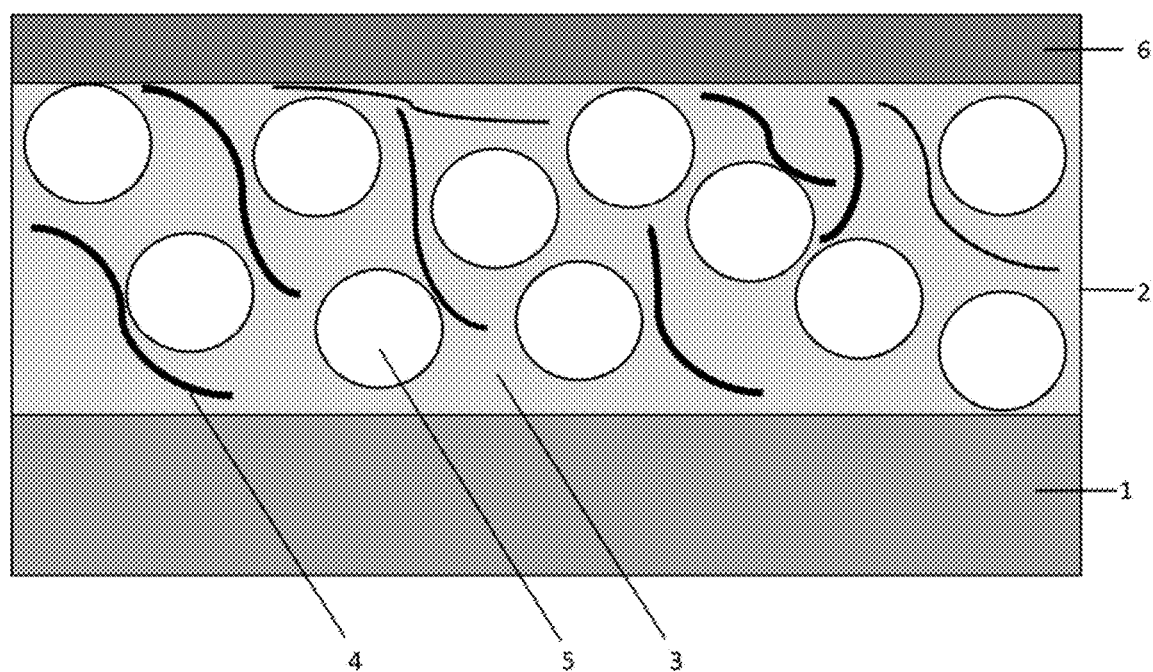

SHEET STRUCTURES CONTAINING NATURAL POLYMERS AND MICROSPHERES

FIELD OF THE INVENTION

The present invention relates to sheet structures containing multiple layers wherein at least one of the layers contains lignocellulosic components and microspheres. The sheet structures can be used as artificial leather, e.g. for flexible automotive interiors.

BACKGROUND ART

EP 3 051 023 A1 discloses a method of producing either artificial leather or a film containing cork particles on the visible side. The product contains several layers in which at least one of them has polyvinyl chloride or polyurethane and a surface coating. The method concerns the effect of diminishing percentage of water in these particles as a solution for "cork explosion". A water content of more than 5% is supposed to result in side reactions with plasticizers leading to the formation of bubbles.

WO 2017/202510 A1 discloses a multi-layer deep-drawn material designed for an interior part of a vehicle in which the foamed PVC layer contains hollow microspheres from 0.5 to 5 wt % and no chemical blowing agents.

PROBLEM TO BE SOLVED BY THE INVENTION

One of the most important trends in the automotive industry is the production of more ecological final products and raw materials. Therefore, the automotive industry demands multi-layered materials with higher percentages of bio-based components which still meet the specifications of this industry.

Therefore, the problem underlying the present invention was to provide a new sheet structure containing a high amount of biological material and PVC without using hazardous blowing agents and having light weight due to low density.

SUMMARY OF THE INVENTION

The problem underlying the present invention was solved by providing a new multi-layered material with higher content of biological material and the elimination of the most commonly used blowing agents by using expanding microspheres.

The present application covers the following aspects [1] to [15].

[1] A sheet structure comprising a carrier layer and a foamed cover layer which contains polyvinyl chloride, lignocellulosic based components and hollow microspheres, wherein the density of the foamed cover layer is preferably less than 1500 kg/m$^3$.

[2] The sheet structure according to [1], wherein the carrier layer is a textile layer.

[3] The sheet structure according to [1] or [2], wherein the lignocellulosic based components are fibers or particles.

[4] The sheet structure according to any one of the preceding aspects, wherein the density of the foamed cover layer is less than 1000 kg/m$^3$, preferably less than 800 kg/m$^3$ less than 500 kg/m$^3$, or less than 300 kg/m$^3$.

[5] The sheet structure according to any one of the preceding aspects, wherein the hollow microspheres have been thermally expanded.

[6] The sheet structure according to any one of the preceding aspects, wherein the foamed cover layer preferably does not contain any chemical foaming agent, preferably no foaming agent other than the hollow microspheres.

[7] The sheet structure according to any one of the preceding aspects, wherein the hollow microspheres make up 15 to 90 vol %, preferably 30 to 90 vol %, more preferably 30 to 80 vol % or 40 to 80 vol % of the total volume of the foamed cover layer.

[8] The sheet structure according to any one of the preceding aspects, wherein the lignocellulosic based components have been chemically modified to decrease their hydrophilicity and/or the polyvinyl chloride has been chemically modified to increase its hydrophilicity.

[9] The sheet structure according to any one of the preceding aspects, wherein the carrier layer has a thickness of 0.1 to 3.0 mm and a foamed cover layer has a thickness of 0.2 to 5.0 mm.

[10] The sheet structure according to any one of the preceding aspects, wherein the foamed cover layer contains 10 to 45 vol % of polyvinyl chloride, 20 to 70 vol % of lignocellulosic based components and 15 to 65 vol % of hollow microspheres, wherein the polyvinylchloride, the lignocellulosic based components and the hollow microspheres make up 70 to 100 vol % of the total volume of the foamed cover layer.

[11] The sheet structure according to any one of the preceding aspects, which is an artificial leather having a grained surface structure.

[12] A process for preparing a sheet structure comprising the following steps:
(a) providing a mixture of, lignocellulosic based components, microspheres, and molten polyvinyl chloride,
(b) heating the mixture to expand the microspheres,
(c) applying the product of step (b) on a carrier layer, and
(d) cooling the product of step (c) to obtain the sheet structure.

[13] The process according to [12], wherein the mixture of step (a) is provided by mixing a pre-paste containing polyvinyl chloride and microspheres with lignocellulosic based components or a pre-paste containing lignocellulosic based components.

[14] A sheet structure obtainable by a process described in [12] or [13].

[15] The use of a sheet structure according to any one of [1] to [11] or [14] as an artificial leather.

ADVANTAGES OF THE INVENTION

The sheet structure of the present invention is a multi-layered material with higher percentage of biological material, lower stiffness, reduced weight, and the elimination of the most commonly used blowing agents that are hazardous to health and have a smell. The lignocellulosic based component (sometimes referred to as "LBC" in this description) may replace conventional fillers such as calcium carbonate and thus guaranty a reduced layer density.

The addition of LBC and microspheres can either have a functional effect, when the LBC is non-visible, or both an aesthetical and functional effect, when it is on the visible side of the material.

The sheet structure is suitable for seats, central consoles, map pocket or even armrest. The material may be used as an artificial leather and may have a nubuck-like feel.

The sheet structure of the present invention is an alternative solution of a more ecological and competitive material in the interiors automotive industry and market for usage in upholstery where flexible materials are needed.

DESCRIPTION OF THE DRAWINGS

FIG. 1 shows sheet structure according to the present invention.

A foamed cover layer (2) is arranged on a carrier layer (1). The foamed cover layer is covered with a lacquer layer (6), which is an optional feature of the present invention. The foamed cover layer (2) contains a matrix of polyvinyl chloride (3), wherein a lignocellulosic based component (4) is dispersed, and hollow microspheres (5).

EMBODIMENTS OF THE INVENTION

Foamed Cover Layer

The foamed cover layer comprises or consists of the PVC, the LBC and the microspheres. The cover layer is a foamed layer having a density of preferably less than 1500 kg/m$^3$, more preferably less than 1000 kg/m$^3$, most preferably less than 500 kg m$^3$.

The microspheres serve as physical foaming agent. In a preferred embodiment, the foamed cover layer does not contain any chemical foaming agent. In a further preferred embodiment, the foamed cover layer does not contain any foaming agent other than microspheres.

The thickness of a foamed cover layer is preferably in the range of 0.1 to 5.0 mm, more preferably 0.2 to 5.0 mm, even more preferably 0.5 to 3.0 mm.

The cover layer may contain usual additives such as plasticizers, stabilizers, anti-aging agent (e.g. antioxidants), fillers, flame retardants (e.g. antimony trioxide or zinc hydroxystannate), pigments (e.g. carbon black, titanium dioxide) and other auxiliary substances (e.g. viscosity aids, adhesion promoters, etc.). An example of an additive is a UV stabiliser. The UV stabiliser may be selected from one or more members of the group consisting of benzotriazole or hindered amine light stabilizers. Other additives are emulsifiers such as carboxymethylcellulose or polyethylene glycol.

The cover layer may be covered by a compact layer that may have a grained surface to imitate natural leather. In that case the sheet structure of the present invention may be used as an artificial leather. The grain may be introduced by known methods such as embossing or using a release paper having a surface showing a negative of the structure of the desired grain. The depth of the grain is less than the thickness of the cover layer and is preferably 10 to 500 µm, more preferably 50 to 500 µm, still more preferably 50 to 300 µm.

As an alternative to the grained structure or in addition to the grained structure mentioned above, a structured surface of the visible side of the cover layer may be obtained by using the microspheres. The amount and the diameter of the microspheres as well as the parameters of the foaming process of the cover layer can be selected such that the expanded microspheres cause projections and indentations on the surface of the foamed cover layer. To achieve such a structured surface, the expanded microspheres preferably make up more than 60 vol % of the total volume of the foamed cover layer and have a diameter, which is more than 100 µm and/or more than 40% of the thickness of the foamed cover layer. More preferably, the expanded microspheres preferably make up more than 70 vol % of the total volume of the foamed cover layer and have a diameter of more than 200 µm and/or more than 60% of the thickness of the foamed cover layer. In addition, the LBCs contained in the foamed cover layer may be visible. The visible expanded microspheres and/or the visible LBCs may confer a new organic nubuck-like feel and look to the structure.

Polyvinyl Chloride

The content of polyvinyl chloride (PVC) is preferably 40 to 90 wt % or 5 to 50 vol %, more preferably 10 to 30 vol % in the cover layer.

The addition of LBCs increases the viscosity of the paste. If the viscosity of the PVC formulation is low, LBCs can be incorporated in higher amounts.

The PVC may be modified to increase its hydrophilicity to increase its compatibility with the LBC. To that end, the PVC may be oxidized or modified by grafting hydrophilic monomers on it. Examples of oxidising agents are benzoyl peroxide or maleic anhydride.

In the present description, the term "PVC" is intended to cover not only unmodified PVC, but also modified PVC, in particular, modified PVC having a higher hydrophilicity than unmodified PVC, i.e. hydrophilized PVC.

The PVC may contain conventionally known softeners to adjust its softness.

Lignocellulosic-Based Components

A lignocellulosic-based component is a natural lignocellulose-containing polymer derived from plants. The LBC contains lignin and cellulose and optionally hemicellulose. The lignin content may be 1 to 50 wt %, preferably 5 to 40 wt %. The cellulose content may be 10 to 95 wt %, preferably 30 to 90 wt %. The hemicellulose content may be up to 50 wt %, preferably up to 30 wt %. The two or three components, respectively, sum up to at least 90 wt %, preferably at least 95 wt % of the LBC. Typically, LBC contains 1 to 50 wt % of lignin, 10 to 95 wt % of cellulose, and 0 to 50 wt % of hemicellulose, wherein the two or three components, respectively, sum up to at least 90 wt % of the LBC.

The content of the LBC is preferably 1 to 70 vol %, more preferably 10 to 30 vol %, and most preferably 20 to 30 vol %, based on the volume of the whole cover layer. Additions of 1 to 5 vol % do not significantly affect the viscosity of the PVC paste.

The LBC may be a fiber or a particle. A fiber is defined by a ratio of length to largest diameter of at least 10, preferably at least 20, and more preferably at least 50. An LBC particle has an aspect ratio, i.e. a ratio of the largest diameter to the smallest diameter orthogonal to it, of preferably less than 5, more preferably less than 2. The particles may have spherical or oval shape.

The LBC may be a natural fiber, i.e. a fiber that is not synthetic or manmade. It can be sourced from plants. The plants, which produce cellulose fibers can be classified into bast fibers (jute, flax, ramie, hemp, and kenaf), seed fibers (cotton, corn, and kapok), leaf fibers (sisal, pineapple, and abaca), grass and reed fibers (rice, corn, and wheat), and core fibers (hemp, kenaf, and jute) as well as all other kinds (wood and roots). Fibers from oil palm, sisal, flax, and jute are typical examples.

The maximum size, i.e. the length of the fiber or the maximum diameter of the particle, of the LBC is preferably in the range of 100 to 1000 µm. The control of the size may prevent the formation of defects in the material. It is preferred that the size of the LBCs is homogenous. A homogenous size has the advantage of a lower probability of defects occurring during the production process. In addition, a homogenous size may be aesthetically desired in those structures that contain visible LBCs. The length of the fibers contained in the foamed cover layer is preferably 200 to 600 μm, wherein the fibers within said range make up at least 90 wt % of all LBCs in the foamed cover layer.

Generally, homogenous particle sizes or fiber lengths are preferred in the present invention. Hence, if the present description mentions a range of a dimensional parameter of a substance, e.g. a range of particle sizes or diameter of microspheres or fiber lengths, it is preferred that the substance falling within the indicated range makes up at least 90 wt % of the total weight of said substance in the foamed cover layer, unless indicated otherwise.

The LBC particles may have a size of 50 to 600 μm or 50 to 400 μm. The layer has a thickness of larger than the size of the particles, and the thickness may be 200 to 1000 μm. The particles may be cork particles. The cork particles should have a moisture content of less than 5 wt %, preferably less than 3 wt %. To that end, the particles are dried and/or exploded before use, as described in EP 3 051023 A1. If the LBC particles are cork particles, their content in the whole cover layer is preferably 1 to 70 vol %, more preferably 10 to 60 vol %, even more preferably 20 to 60 vol % and most preferably 30 to 55 vol %. It is preferred that at least 90 vol % of the cork particles contained in the cover layer have a diameter of 10 to 500 μm, more preferably 10 to 200 μm. In one embodiment, the content of the cork particles in the cover layer is 30 to 55 vol %, and at least 90 vol % of the particles have a diameter of 10 to 200 μm.

The LBC may be modified using pre-treatments. Different kinds of chemical treatments are known to change the properties of the fibers and include silane, alkali, acrylation, benzoylation, maleated coupling agents, permanganate, acrylonitrile and acetylation grafting, stearic acid, peroxide, isocyanate, triazine, fatty acid derivate (oleoyl chloride), and sodium chloride. In the present invention, those modifications are preferred that result in a decrease of the hydrophilicity of the LBC to increase its chemical affinity to and compatibility with the PVC matrix. For instance, an alkaline and/or acetylation pre-treatment eliminates hydroxyl groups of LBC. The use of silane-based agents increases the wettability of LBC by bonding hydrocarbon chains to cellulose by substitution of hydroxyl groups at the surface and thus improving its chemical affinity to PVC. The modification may be a carboxymethyl ester of the hydroxyl group, which is the same as the modification in carboxymethylcellulose. The hydrophilicity of the LBC may be adjusted by the degree of carboxymethylation.

Furthermore, the content of lignin being hydrophobic may be increased in the LBC to decrease its overall hydrophilicity. Alternatively, fibers having a high content of lignin may be used, such as bagasse having a lignin content of about 25 wt %, oil palm or bamboo (about 30 wt %) or coir (more than 40 wt %).

The modifications to decrease the hydrophilicity of the LBC and increase the hydrophilicity of the PVC may be combined.

In addition, emulsifiers such as carboxymethylcellulose may be used to increase the compatibility of hydrophilic LBC and hydrophobic PVC and microspheres.

Additionally, a light weight LBC may be used to decrease the density of the cover layer. The density of the LBC is less than 500 kg/m$^3$, preferably less than 300 kg/m$^3$ and may be 60-300 kg/m$^3$.

It may be critical to control the size and density of LBC to achieve the desired effects, in particular, in the case of visible LBC in e.g. artificial leather.

Hollow Microspheres

The hollow microspheres (sometimes simply referred to as "microspheres" in the present description) in the cover layer are expanded. The thermally expanding microspheres serve as a foaming agent in the preparation of the foamed cover layer and increase the thickness of the layer upon expansion. The expansion of the microspheres is preferably carried out to avoid an explosion of the microspheres during the preparation process.

The microspheres may be filled with liquid or, preferably, gas.

The diameter of the microspheres is smaller than the thickness of the cover layer, preferably less than 50%, more preferably less than 20% or less than 10% of the thickness of the cover layer. The diameter of the microspheres, i.e. of the expanded microspheres in the foamed cover layer, is preferably 10 to 1000 μm, more preferably 30 to 500 μm, most preferably 30 to 250 μm. A typical diameter range is 40 to 120 μm. The aspect ratio of the microspheres is preferably close to 1, e.g. 1.0 to 2.0, preferably 1.0 to 1.5.

In an embodiment the present invention, the foamed cover layer contains LBCs having a length of 200 to 600 μm and making up at least 90 wt % of all LBCs in the foamed cover layer, and microspheres having diameters of 30 to 200μμm and making up at least 90 wt % of all microspheres in the foamed cover layer.

Typical microspheres are thermally expandable microcapsules and consist of a polymer shell encapsulating a gas blowing agent, e.g. an aliphatic hydrocarbon. The diameter of the microsphere before expansion may be 10 to 50 μm, its density may be 0.8 to 1.5 g/cm$^3$. Heating may be carried out at a temperature range of 90 to 200° C. It is preferred that the diameter of the microsphere is increased 3 to 5 times. Hence, the volume may increase to 30 to 100 times of the original. The expanded microsphere preferably has a diameter of 30 to 250 μm and a density of 0.01 to 0.05 g/cm$^3$.

Examples of such expandable microspheres consist of a thermoplastic shell (e.g. a copolymer, such as vinylidene chloride and acrylonitrile or methyl methacrylate) that encapsulates a hydrocarbon blowing agent (typically isobutene or isopentane).

Other examples of expandable microspheres are phenolic and amino-based spheres. Phenolic microspheres may be based on water-miscible phenolic resole resins and may thus be more compatible with LBC. The use of phenolic resin, which is naturally fire resistant, has the additional advantage that it provides a nonhalogenated flame-resistant filler with far less mass than other flame-retardant fillers, such as alumina trihydrate (ATH).

The cover layer may contain 1 to 20 wt % of microspheres. Since the density of the expanded microspheres is very low, the content of microspheres is preferably 5 to 95 vol %, more preferably 10 to 60 vol % and most preferably 10 to 30 vol % in the cover layer.

The microspheres should be selected to be compatible with the optionally hydrophobized LBC and the optionally hydrophilized PVC. To that end, depending on the structures of the LBC and PVC used, the microspheres may have an outer surface that is hydrophilized or hydrophobized to enable a homogenous mixture with the other components of the cover layer. The content of (meth)acrylate in the copolymer of the microsphere may be used to adjust the hydrophilicity.

A good dispersion may be achieved by preparing a pre-paste A containing LBC and a pre-paste B containing PVC and microspheres. The PVC of pre-paste B may contain a plasticizer. Pre-paste B may contain additives, e.g. an emulsifier such as carboxymethylcellulose. The compatibility of LBC and PVC may be increased by modifying one or both of LBC and PVC as described above. The LBC in the pie-paste may be hydrophobized. The PVC contained in the pre-paste may be hydrophilized or more hydrophilized than the PVC contained in the polymer composition.

Since microspheres have an aspect ratio of close to 1, they have inherent isotropic property and do not orient during processing, e.g. extrusion. Therefore, the presence of microspheres obstructs the directional orientation of fibers and matrix resulting in a more homogenous distribution of the fibers. The regular shape of the microsphere can contribute to product surface quality and appearance as well. For instance, a fiber that would tend to migrate to the surface of a composition during processing is more evenly dispersed throughout the composition by the interactions with the microspheres. Therefore, a content of microspheres can contribute to an advantageous surface look of the visible side of the structure. This effect is particularly achieved if the foamed cover layer contains LBCs having a length of 200 to 600 µm and microspheres having diameters of 30 to 200 µm.

Carrier Layer

The carrier layer differs from the cover layer in its composition.

The carrier layer may be in direct contact with the cover layer. This means that no other layer or adhesive is present between the carrier layer and the cover layer.

However, it is preferred that an adhesive layer is arranged between the carrier layer and the cover layer.

The thickness of the carrier layer is preferably 0.1 to 2.0 mm, more preferably 0.1 to 1.0 mm.

The carrier layer may be a textile layer. The textile carrier material may be, for example, a woven fabric, a nonwoven or a knit fabric. The textile layer may be made of recycled, synthetic or natural fibres. Natural fibers may be cotton. Chemical fibers may be polyamide, polyester or glass fibers.

Lacquer Layer

The lacquer layer is an optional layer and may be a conventional material, which is based e.g. on polyurethane. If present, it is arranged as a surface layer on the cover layer or it may be a surface layer on a compact layer that is arranged on the cover layer.

The thickness of the lacquer layer may preferably be 1 to 30 µm, more preferably 3 to 10 µm.

The lacquer layer may be transparent. In that case, the LBCs present in the cover layer may be visible.

Manufacturing Process

A process for preparing a sheet structure according to the present invention comprises the following steps:

(a) providing a mixture of, lignocellulosic based components, microspheres, and molten polyvinyl chloride, (b) heating the mixture to expand the microspheres, (c) applying the product of step (b) on a carrier layer, and (d) cooling the product of step (c) to obtain the sheet structure.

In this process, the mixture of step (a) may be provided by mixing a pre-paste containing polyvinyl chloride and microspheres with lignocellulosic based components or a pre-paste containing them.

A good dispersion may be achieved by preparing a pre-paste A containing LBC and a pre-paste B containing PVC and microspheres. The PVC of pre-paste B may contain a plasticizer. Preferably, pre-paste A is filtered to improve the mixture. Pre-paste B may contain additives, e.g. an emulsifier such as carboxymethylcellulose.

The mixture of step (a) is prepared by mixing pre-paste B either with LBC as a powder or with pre-paste A containing LBC.

The mixing process of LBC and microspheres is controlled to avoid the presence of air bubbles immediately before the application of the paste. A good dispersion is achieved by the slow and graduate addition of the LBC and avoiding too long mixing times to prevent the pastes to increase in viscosity due to higher temperatures in the mass as a result of the mechanical energy transformed in thermal energy.

The mixture of step (a) is preferably prepared for a knife coating process.

Steps (a) and (b) are preferably carried out in a knife coating process.

The present invention also relates to a sheet structure obtainable by a process described above, preferably obtainable in step (d). In a preferred embodiment, the sheet structure is obtainable by a process consisting of steps (a) to (d) above.

EXAMPLES

The following parameters are used to describe the properties of the sheet structure of the present invention: flex resistance test according to DIN EN 32100 Bally Flex, bending Stiffness according to DIN 53350:1980, elongations at break according to DIN EN ISO 1421, odor test according to VDA 270.

A sheet structure was prepared, which contained PES as a support layer, an adhesive layer, a foamed cover layer, a PVC compact layer and a lacquer layer in that order.

The following four materials were used as the foamed cover layer:

No. 1: PVC Standard

No. 2: PVC Microspheres—Lightweight PVC with microspheres

No. 3: PVC Cork—Lightweight PVC with cork

No. 4: PVC Microspheres and Cork—Lightweight PVC with cork and microspheres

The foamed cover layer had a thickness of 0.20 mm. If present, the content of the hollow microspheres in the cover layer was 20 vol %, the diameter of the expanded particles was 120 µm. If present, the content of the cork was 46 vol %, and 90% of the particles had a diameter of 10 to 200 µm.

The results are shown in Table 1.

TABLE 1

| Material | Elongation at Break Lengthwise % | Flex Endurance Test 1 Milion Cycles Grade | Bending stiffness N (Lengthwise) | Bending stiffness N (Transverse) | Odor Grade |
|---|---|---|---|---|---|
| No. 1 | 120.432 | 4 at 300 000 Cycles | 11 | 16 | 3 |
| No. 2 | 119.086 | 0 | 3 | 6 | — |
| No. 3 | 126.744 | 2 | 3 | 4 | — |
| No. 4 | 129.844 | 0 | 3 | 3 | 2.5 |

The elongation at break is a relevant index of evaluation of the suitability of the material to dress the seat main structure while the material is being stretched. A high elongation at break indicates that the material can go through this process and recover its original form without breaking. The results show that the addition of microspheres does not affect this property in comparison with PVC alone. The inclusion of cork increases the ability of the material to be stretched without breakage. Hence, this material meets the requirement of increasing the elongation capability by more than 10%.

The endurance on flexing relates to the durability of the material when used by the final consumer. For instance, namely in the side parts of a seat the material is subject to high force due to the movement of the final user when seated or when exiting the car and the sew parts on the edges of the part. The results show that the sheet structure containing material No. 1 breaks much earlier (grade 4 at 300,000 cycles) than any lightweight concept. The sheet structure according to the present invention does not show any damages (grade 0) at 1,000,000 cycles.

Summarizing the test results, Table 1 shows the advantageous properties of the material of the present invention. In particular, the material of the present invention shows a high elongation at break similar to the cork-containing material but superior to the microsphere-containing material and a high flexing endurance similar to the microsphere-containing material but superior to the cork-containing material. Therefore, the sheet structure of the present invention, i.e. the sheet structure containing material No. 4 in the foamed cover layer, has an advantageous combination of properties.

The stiffness of an interior is relevant for cut and sew applications. The elimination of blowing agents and fillers leads to a less stiff material. The inventive sheet structure having low stiffness is suitable for cut and sew applications.

The smell of material No. 4 was very different from the smell of material No. 1. While material No. 4 smells like burned wood, material No. 4 has the "new car smell".

REFERENCE NUMERALS (1) carrier layer
(2) foamed cover layer
(3) polyvinyl chloride
(4) lignocellulosic based component (LBC)
(5) hollow microsphere
(6) lacquer layer

What is claimed is:

1. A sheet structure comprising a carrier layer and a foamed cover layer which contains polyvinyl chloride, lignocellulosic based components and hollow microspheres, wherein the density of the foamed cover layer is less than 1500 kg/m$^3$, and the hollow microspheres make up 15 to 90 vol % of the total volume of the foamed cover layer.

2. The sheet structure according to claim 1, wherein the carrier layer is a textile layer.

3. The sheet structure according to claim 1, wherein the lignocellulosic based components are fibers or particles.

4. The sheet structure according to claim 1, wherein the density of the foamed cover layer is less than 1000 kg/m$^3$.

5. The sheet structure according to claim 1, wherein the hollow microspheres have been thermally expanded.

6. The sheet structure according to claim 1, wherein the foamed cover layer does not contain any chemical foaming agent.

7. The sheet structure according to claim 1, wherein at least one modification has been carried out selected from the group consisting of a chemical modification of the lignocellulosic based components to decrease their hydrophilicity and a chemical modification of the polyvinyl chloride to increase its hydrophilicity.

8. The sheet structure according to claim 1, wherein the carrier layer has a thickness of 0.1 to 3.0 mm and a foamed cover layer has a thickness of 0.2 to 5.0 mm.

9. The sheet structure according to claim 1, wherein the foamed cover layer contains 10 to 45 vol % of polyvinyl chloride, 20 to 70 vol % of lignocellulosic based components and 5 to 65 vol % of hollow microspheres, wherein the polyvinylchloride, the lignocellulosic based components and the hollow microspheres make up 70 to 100 vol % of the total volume of the foamed cover layer.

10. The sheet structure according to claim 1, which is an artificial leather having a grained surface structure.

11. A process for preparing a sheet structure comprising the following steps:
(a) providing a mixture of lignocellulosic based components, microspheres, and molten polyvinyl chloride,
(b) heating the mixture to expand the microspheres,
(c) applying the product of step (b) on a carrier layer, and
(d) cooling the product of step (c) to obtain the sheet structure,
wherein the mixture of step (a) is provided by mixing a prepaste containing polyvinyl chloride and microspheres with lignocellulosic based components or a pre-paste containing lignocellulosic based components.

* * * * *